United States Patent

Chambers

[11] Patent Number: 5,857,538
[45] Date of Patent: Jan. 12, 1999

[54] MOTORCYCLE

[76] Inventor: Herbert M. Chambers, 2311 Christian St., Baton Rouge, La. 70808

[21] Appl. No.: 792,157

[22] Filed: Jan. 30, 1997

Related U.S. Application Data

[60] Provisional application No. 60/010,895 Jan. 31, 1996.
[51] Int. Cl.[6] .................................................. B62K 11/06
[52] U.S. Cl. ............................................ 180/219; 180/312
[58] Field of Search ................................... 180/219, 227, 180/311, 312; D12/107, 110

[56] References Cited

U.S. PATENT DOCUMENTS

| | | | |
|---|---|---|---|
| 4,280,582 | 7/1981 | Kouyama et al. ........................ | 180/219 |
| 4,433,747 | 2/1984 | Offenstadt ................................ | 180/227 |
| 5,109,943 | 5/1992 | Crenshaw et al. ....................... | 180/219 |
| 5,469,930 | 11/1995 | Wiers ....................................... | 180/227 |
| 5,775,454 | 7/1998 | Scherbarth et al. ..................... | 180/219 |

OTHER PUBLICATIONS

American Iron Magazine; (USPS 007–321) (ISSN 1059–7891) Jul. 1992,vol. 4, No. 7 Published by Tam Communications, Inc.; p. 18.
American Iron Magazine; (USPS 007–321) (ISSN 1059–7891) Jul. 1995, vol. 7 No. 7 Published by Tam Communications, Inc.; pp. 36; 85.
Hot Bike; May 1996, vol. 28, No. 5; Published by McMullen & Yee Publishing, Inc.; pp. 2, 13, 41, 133.
Hot Bike; Apr. 1994, vol. 26, No. 4; Published by McMullen & Yee Publishing, Inc.; pp. 52, 53, 55, 108 and p. 114.
Hot Bike; May 1992, vol. 24, No. 4; Published by McMullen & Yee Publishing Co., pp. 12 and 33.

*Primary Examiner*—Kevin Hurley
*Attorney, Agent, or Firm*—David L. Ray

[57] ABSTRACT

A motorcycle similar to a Harley-Davidson motorcycle that has a very rigid frame that does not twist and flex appreciably while rapidly accelerating and turning at high speeds of sixty miles per hour and greater. Both front and rear wheels remain in close alignment during acceleration and at high speeds for improved performance, when traveling in a straight line and when turning. The motorcycle has the engine drive sprocket and the transmission driven sprocket on the left side of the motorcycle, and the drive chain, drive chain sprocket and transmission drive gear mounted on the right side of the motorcycle. The transmission is separate from the engine and drives a chain drive to the rear wheel on the right side of the motorcycle, and the distance between the driven shaft of the transmission and the drive shaft of the engine minimized, providing the strength and flex resistance to absorb large quantities of torque and horsepower because of the capability of providing both greater housing support at the drive shaft's outermost point and an outermost bearing support system as well.

20 Claims, 5 Drawing Sheets

MOTORCYCLE

CROSS-REFERENCE TO RELATED APPLICATIONS

This application claims the benefit of the filing date and priority of co-pending provisional application Ser. No. 60/010,895 filed Jan. 31, 1996.

BACKGROUND OF THE INVENTION

1. Field of the Invention

The invention relates to motorcycles. In particular, the invention relates to the American motorcycle type of motorcycle having a relatively long wheelbase, low seat height, similar in size and shape, and engine type, to Harley-Davidson motorcycles manufactured by Harley-Davidson, Inc.

2. Description of the Related Art

It is known in the art that Harley-Davidson motorcycles twist and flex when accelerating rapidly, turning corners rapidly, and upon traveling over street irregularities commonly encountered in operations for which the motorcycle is intended. Wheel alignment may vary at high speeds, when turning at high speeds, upon hitting bumps and holes in the street surface, and upon hitting such street irregularities while turning corners.

SUMMARY OF THE INVENTION

In accordance with the present invention there is provided a motorcycle similar to a Harley-Davidson motorcycle that has a very rigid frame that does not twist and flex appreciably while rapidly accelerating and turning at high speeds of sixty miles per hour and greater. Both front and rear wheels remain in close alignment during acceleration and at high speeds for improved performance, when traveling in a straight line and when turning. The motorcycle of the present invention can utilize radial tires to enhance stability of the motorcycle at high speeds.

The motorcycle of the invention has the engine drive sprocket and the transmission driven sprocket on the left side of the motorcycle, and the drive chain, drive chain sprocket and transmission drive gear mounted on the right side of the motorcycle. A hard steel shaft runs through a machined connection cylinder rigidly connected to the mainframe of the motorcycle. The swingarms supporting the rear wheel of the motorcycle pivot about the steel shaft and the powertrain is bolted to this same steel shaft.

The transmission is separate from the engine and drives a chain drive to the rear wheel on the right side of the motorcycle, and the distance between the driven shaft of the transmission and the drive shaft of the engine minimized, providing the strength and flex resistance to absorb large quantities of torque and horsepower because of the capability of providing both greater housing support at the drive shaft's outermost point and an outermost bearing support system as well.

DESCRIPTION OF THE PREFERRED EMBODIMENTS

Figure 1:
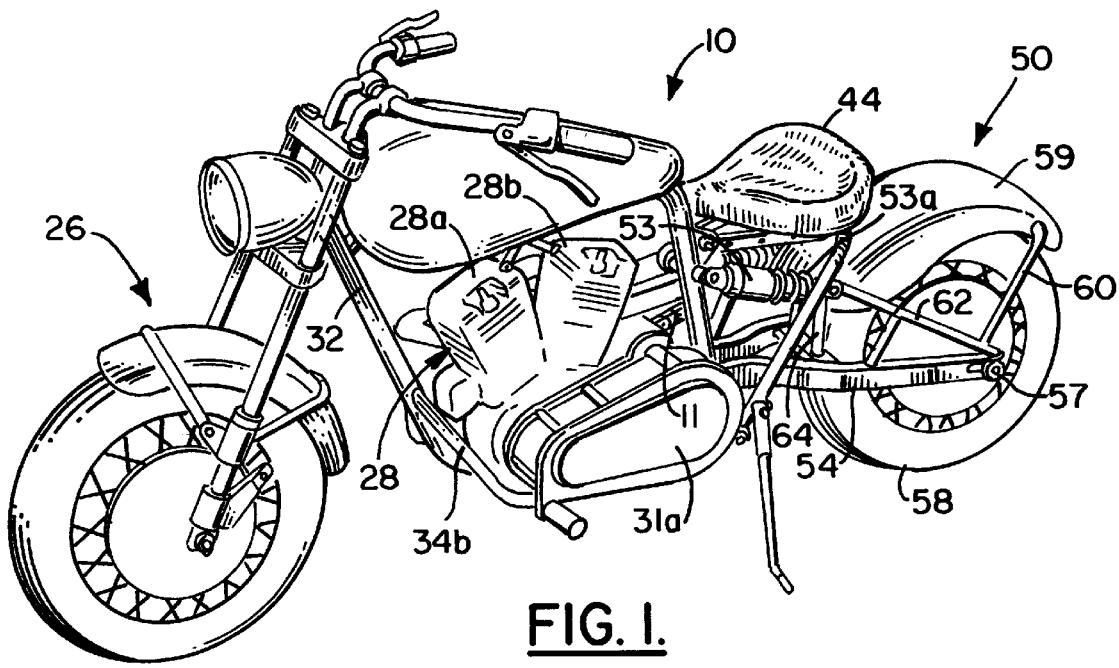
FIG. 1 is a perspective view of the motorcycle of the invention from the left side.
Figure 9:
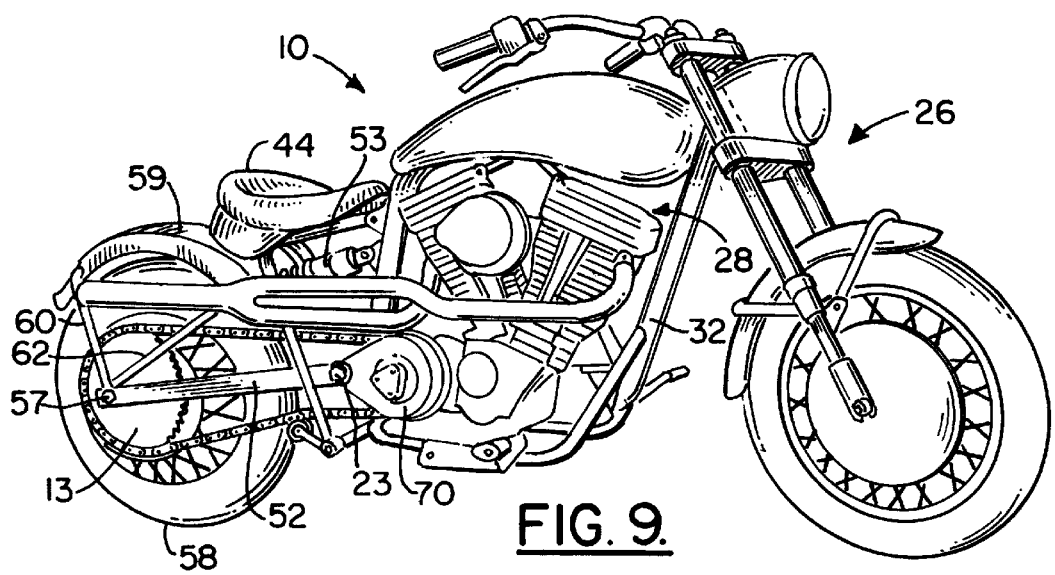
FIG. 9 is a perspective view of the motorcycle of the invention from the right side.
Figure 10:
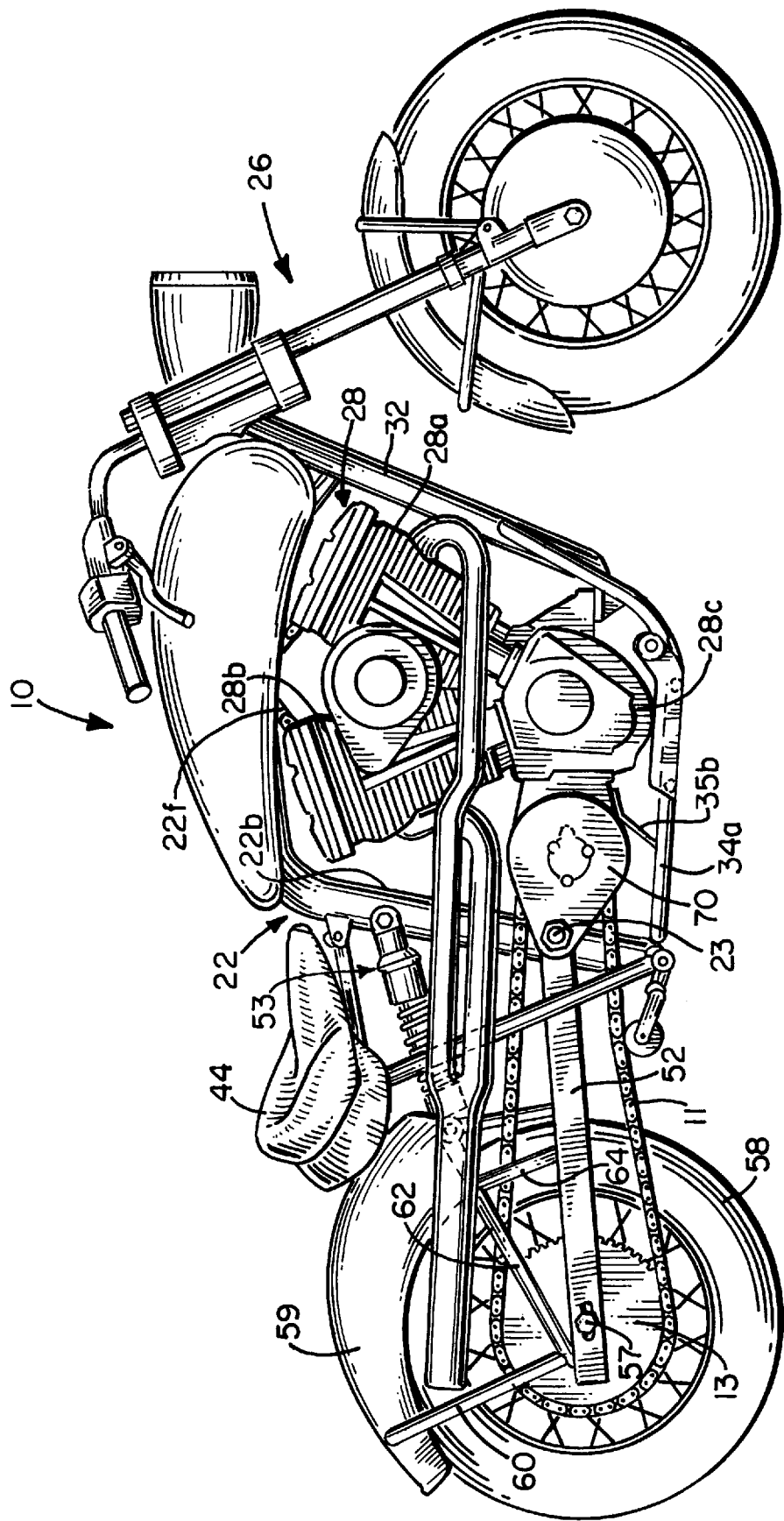
FIG. 10 is a side elevational view of the motorcycle of the invention.
Figure 11:
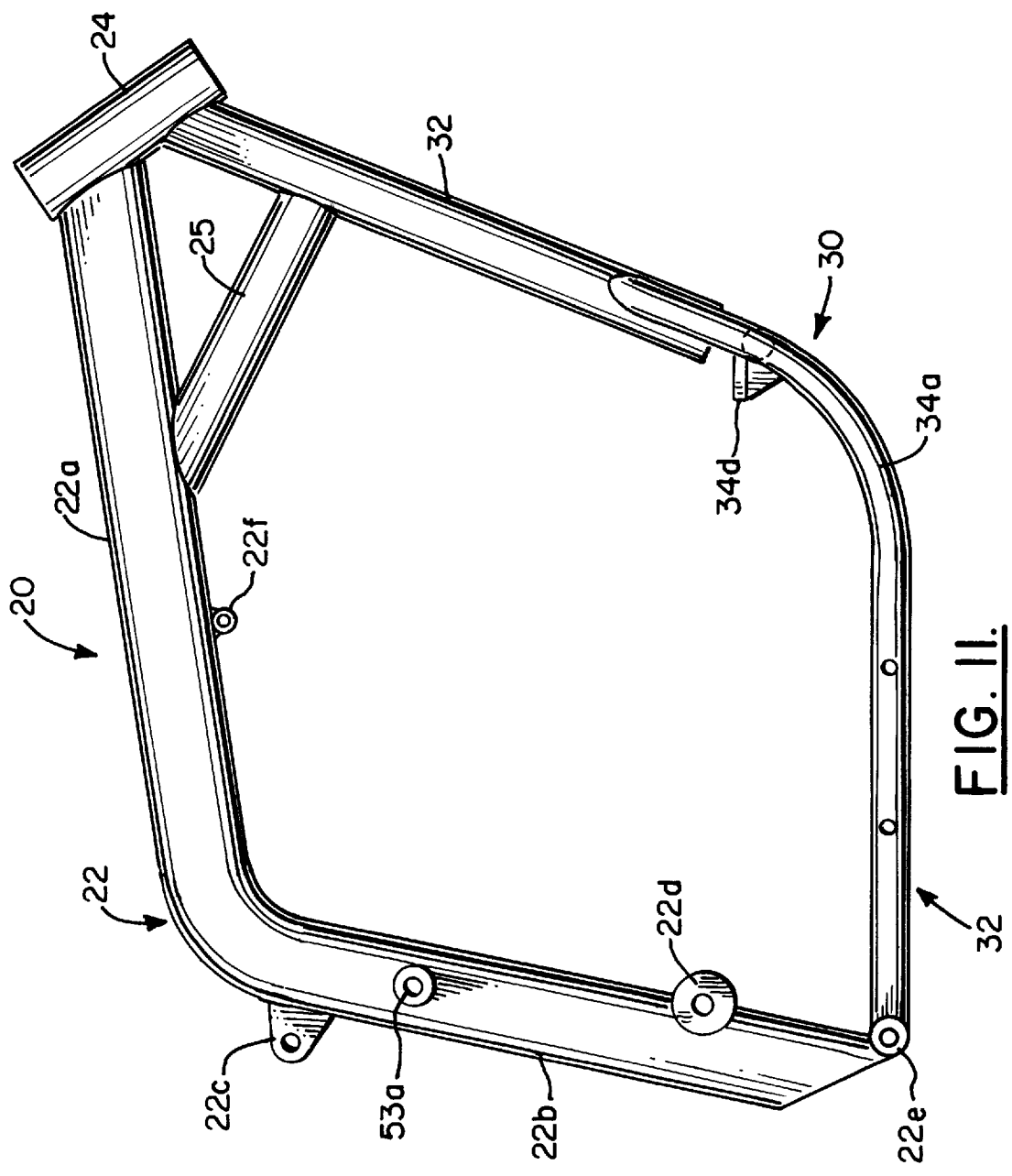
FIG. 11 is a elevational view of the mainframe of the invention taken from the right side with some components removed.

Referring now to the drawings, in FIGS. 1, 9, and 10 is shown the improved motorcycle of the invention generally indicated by the numeral 10. The chain 11 driving the rear wheel 58 can be seen to be located on the right side of motorcycle 10.

Figure 2:
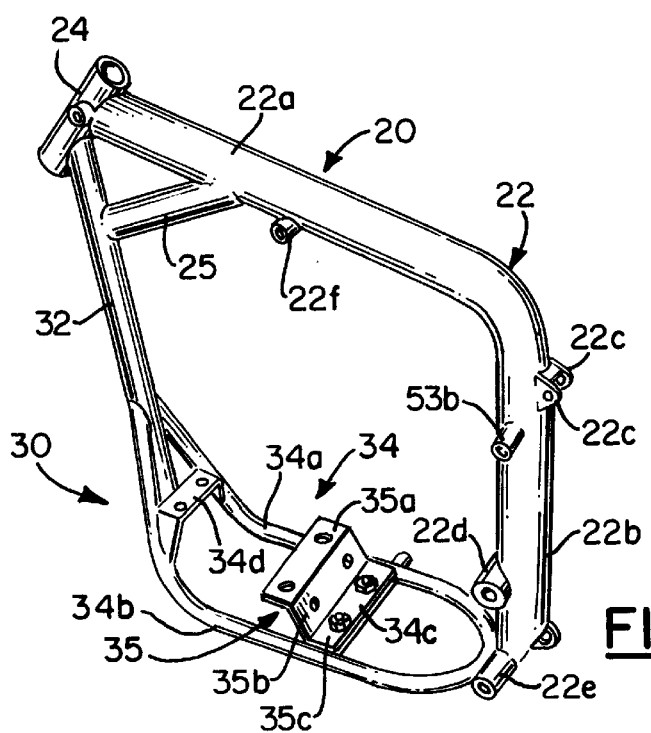
FIG. 2 is a perspective view of the mainframe of the invention taken from the left side.

As can best be seen in FIG. 2, motorcycle 10 has an extremely rigid mainframe generally indicated by the numeral 20. The backbone generally indicated by the numeral 22 is a hollow steel tube preferably about three inches in outside diameter and has a wall thickness of 0.125 inches. Backbone 22 has a generally horizontal portion 22a and a generally vertical portion 22b bent downward at an obtuse angle from horizontal portion 22a. Vertical portion 22b is preferably integrally formed with horizontal portion 22a. Backbone 22 has a hollow, generally cylindrical steering head 24 rigidly welded thereto for rotating receipt of the front wheel assembly generally indicated by the numeral 26.

Rigidly connected to vertical portion 22b of backbone 22 is connection cylinder 22d shown in FIGS. 2, 5, 6, and 11. Connection cylinder 22d is preferably machined from a metal billet, preferably an alloy of steel and chromium such as 4130 Chromoly, and is preferably welded to vertical portion 22b. Connection cylinder 22d has a wall thickness of 0.25 inch and is adapted to receive a cylindrical shaft 23 shown in FIG. 6 and 10.

Mainframe 20 has a steel engine support assembly generally indicated by the numeral 30. Engine support assembly 30 has a generally vertical hollow downtube 32 which is welded at its upper end to backbone 22 and steering head 24. Downtube 32 is preferably two inches in outside diameter and has a wall thickness of 0.095 inches. Preferably brace 25 is welded to portion 32 and portion 22a for additional strength and rigidity of mainframe 20.

Downtube 32 has engine support assembly 30 connected thereto. Engine support assembly 30 includes a generally horizontal cradle 34 rigidly welded to downtube 32 at the lower end thereof to which the crankcase 28c of engine 28 is bolted to at plate 35a of bracket 35, bracket 35 having a generally vertical section 35b rigidly connected to generally horizontal plate 35a and generally horizontal plate 35c. Plate 35c is bolted to brace 34c. Engine crankcase 28c is also bolted to member 34d. Cradle 34 preferably has two hollow generally horizontal spaced-apart members 34a. and 34b welded at the rear end thereof to the lower end of vertical portion 22b of backbone 20. Preferably members 34a and 34b are about one and one-fourth inches in outside diameter and have a wall thickness of about 0.095 inches. A brace 34c is preferably welded between members 34a and 34b for additional strength and rigidity.

Figure 3:
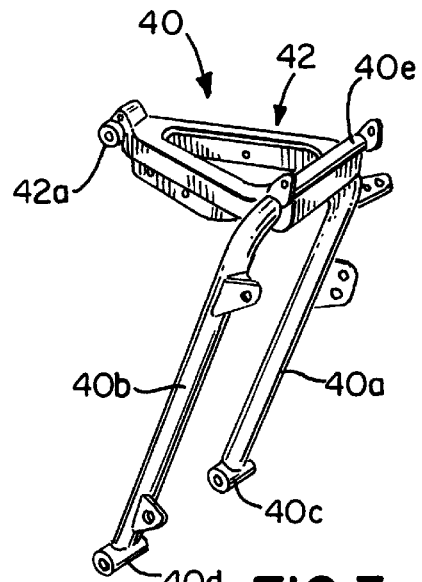
FIG. 3 is a perspective view of the centering apparatus of seat support assembly of the invention.

The seat support assembly can best be seen in FIG. 3 generally indicated by the numeral 40. Seat support assembly 40 includes two spaced-apart parallel generally vertical members 40a and 40b which are rotatably connected at their lower ends 40c and 40d to threaded cylinder 22e on portion 22b of backbone 22 and at their upper ends to horizontal connecting member 40e. Seat support assembly 40 has a generally triangular seat support frame generally indicated by the numeral 42 for connection to seat 44. Seat support assembly has a threaded connection cylinder 42a at the front end thereof for connection to brackets 22c—22c on portion 22b of backbone 22.

Figure 4:
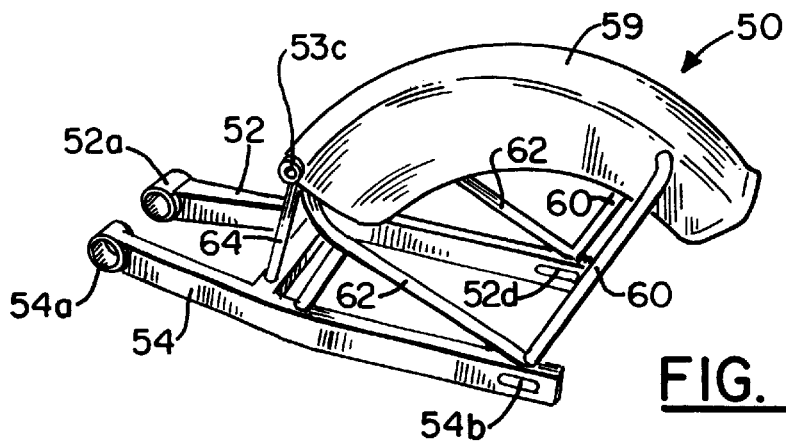
FIG. 4 is a perspective view of the rear suspension assembly of the invention.
Figure 5:
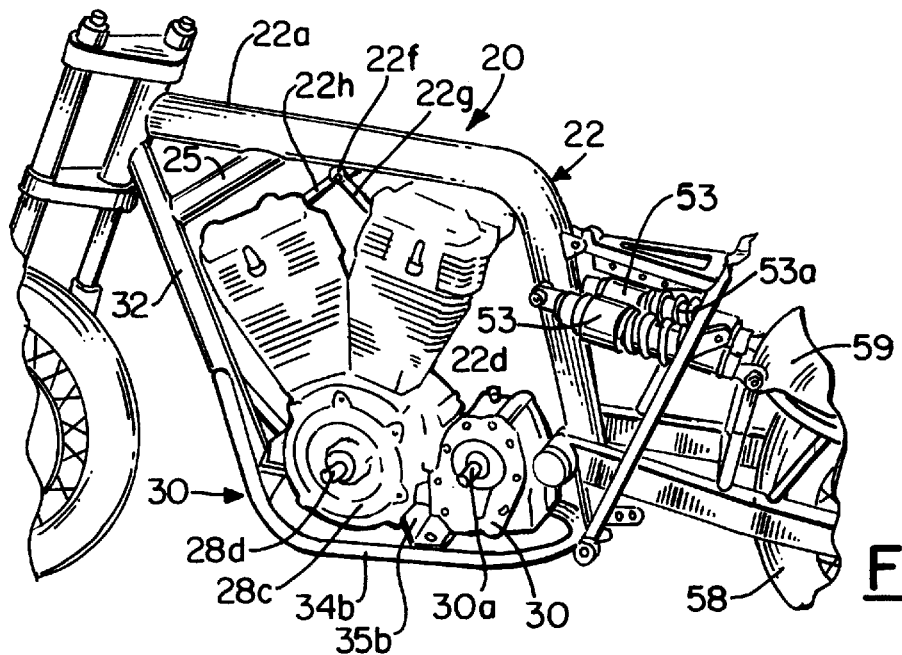
FIG. 5 is a partly cut-away perspective view of the left side of the motorcycle of the invention with the engine sprocket and transmission sprocket, and the cover therefore, removed showing the engine drive shaft and the transmission driven shaft.
Figure 6:
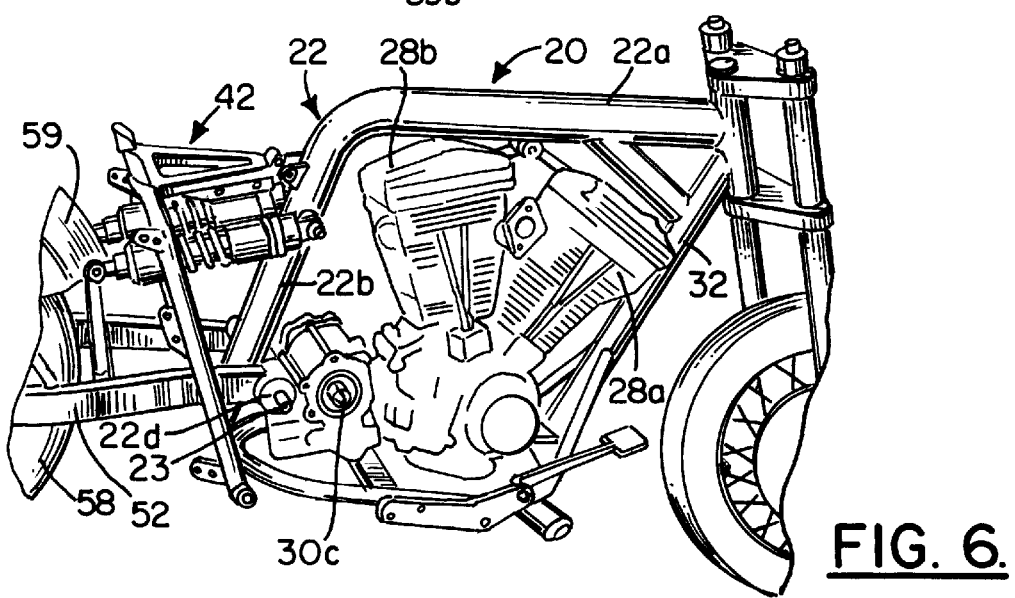
FIG. 6 is a partly cut-away perspective view of the right side of the motorcycle of the invention showing the transmission drive shaft with the cover therefore removed.
Figure 7:
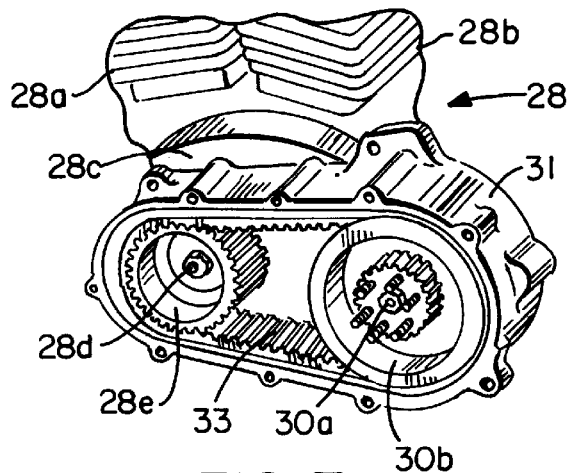
FIG. 7 is a partly cut-away detailed perspective view of the engine drive sprocket and the transmission driven sprocket connected by a drive belt with the cover therefore removed.
Figure 8:
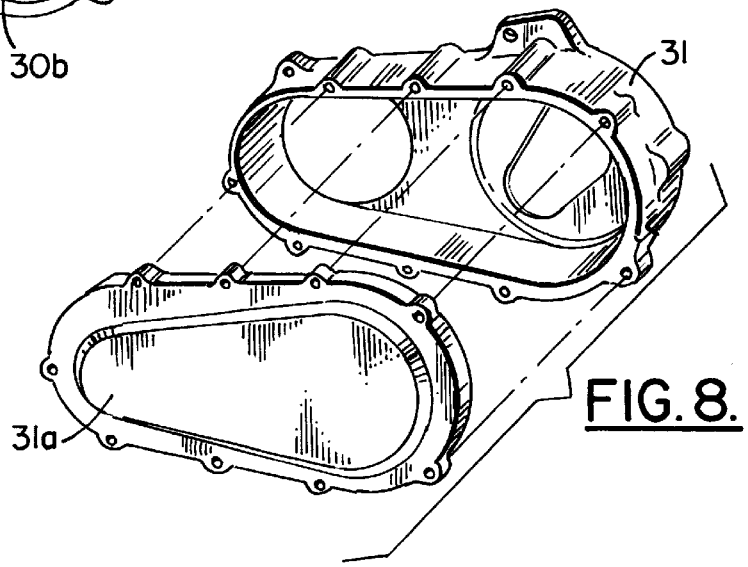
FIG. 8 is a perspective view of the housing and cover for the drive shaft sprocket and transmission sprocket housing and cover.

The rear wheel support assembly is a conventional rear wheel support assembly as can best be seen in FIG. 4 and is generally indicated by the numeral 50. Assembly 50 has two parallel swingarms 52 and 54 which are rotatably connected by hollow sleeves or cylinders 52a and 54a to connection cylinder 22d on portion 22b of backbone 22 shown in FIG. 3 and 11 to lock the mainframe 20 and backbone 22 to the swingarms 52 and 54, and two conventional shock absorbers 53—53 having springs 53a thereon are rigidly connected to connection cylinder 53b on the vertical portion 22b of backbone 22 and to connection cylinder 53c which is connected to member 64. The axle 57 of rear wheel 58 is received in slots 52b and 54b in swingarms 52 and 54, respectively. Rear fender 59 is rigidly connected to conventional swingarms 52 and 54 by members 60—60, 62—62, and 64.

Engine 28 is rigidly connected to cradle 34 by bolting or the like. Engine 28 has two cylinders 28a and 28b connected to a crankcase 28c and is preferably air-cooled four-cycle engine made by S&S Cycle Inc., Box 215, Route 2, County G, Viola, WI 54664, having a bore of 91 millimeters, a stroke of 114 millimeters, with a resultant displacement of 93 cubic inches. Engine 28 has a drive shaft 28d extending therefrom which has a sprocket 28e connected thereto. A transmission 30 is located adjacent to crankcase 28c and has a drive shaft 30a and a sprocket 30b connected thereto. Transmission 30 is bolted to plate 35b and to drive guard 31. A belt 33 is connected to the outside of sprocket 28e and 30b to enable sprocket 28e to drive sprocket 30b. The transmission is separate from the engine and drives shaft 30c on the right side of motorcycle 10 having a conventional sprocket (not shown) attached thereto over which a chain 11 is fitted to drive the sprocket 13 on rear wheel 58 on the right side of motorcycle 10. Engine 28 preferably is connected at cylinders 28a and 28b to connection cylinder 22f on backbone 22 by members 22g and 22h.

Sprockets 28e and 30b are enclosed by primary drive guard 31. Primary drive guard 31 is preferably a one-piece housing machined from a billet of high strength metal alloy to provide a rigid connection of the transmission 30 bolted thereto in close proximity to engine crankcase 28c. Primary drive cover plate 31a is bolted to primary drive guard 31 to enclose sprockets 28e, 30b, and belt 32 and protect them from dirt, water, and the like.

Primary drive guard 31 enables the transmission 30 to be rigidly located as close to engine crankcase 28c as possible to shorten the center to center distance between the motor and transmission sprockets 28e and 30b, providing the strength and flex resistance to absorb large quantities of torque and horsepower because of the capability of providing both greater housing support at the drive shaft's outermost point and an outermost bearing support system as well.

Preferably the distance between engine drive shaft 28d and transmission drive shaft 30a is about nine inches. Furthermore, to achieve further rigidity, an approximately ½ inch thick plate 70 best seen in FIG. 10 is bolted to transmission 30 on the right side of motorcycle 10 and to the outside of swingarm 52 at 52a on connection cylinder 22d on member 22b of mainframe 20. Preferably, the outside diameter of cylinder 22d is about two inches to insure alignment of rear wheel assembly 50 with mainframe 20, and to provide a rigid connection of transmission 30 to backbone 22.

The mainframe 20 can be seen to closely conform to the outside of the engine 28 and transmission 30. Such an arrangement increases the rigidity of mainframe 20 and reduces twisting during acceleration and cornering at high speeds. The ratio of the distance between drive shafts 28d and 30a and the distance between members 32 and 22b along the plane including drive shafts 28d and 30a is important to achieve rigidity.

The distance between connection cylinder 22d and downtube 32 along the plane including drive shafts 28d and 30a is about 20 inches. Preferably, the ratio of the distance between drive shafts 28d and 30a and the distance between downtube 32 and connection cylinder 22d along the plane including drive shafts 28d and 30a is about 1:2. More, preferably, the ratio of the distance between drive shafts 28d and 30a and the distance between downtube 32 and connection tube 22d along the plane including drive shafts 28d and 30a is about 0.9:2; more preferably, about 0.8:2.

It can thus be seen that the present invention provides a motorcycle having an extremely rigid one-piece mainframe 20 with an extremely rigid connection to the rear wheel assembly and front wheel assembly which provides a superior ride. Connecting the engine 28 rigidly and closely to transmission 30 first by a one piece housing 31 machined from a billet of high strength metal alloy and second by connecting the engine 28 and transmission 30 by a machined bracket 35 connected to brace 34d as shown in FIG. 2, and furthermore connecting the housing 31 to mainframe 20 at connection cylinder 22d and connecting the transmission 30 by machined plate 70 to the same connection cylinder 22d on backbone 22 to which the swingarms 52 and 54 are connected are believed to provide such rigid characteristics and superior ride of the motorcycle of the invention.

The engine, transmission, and primary drive system design use standard components proven over millions of street miles yet comprised of heavy duty castings and internal components proven over thousands of passes and racing miles to withstand maximum performance capacity under the most over-stressed conditions.

The transmission, though traditional and proven in design, has been modified to shorten the center to center distance between the motor and transmission sprockets and to drive output on the right (other) side of the motorcycle, providing the strength and flex resistance to absorb huge quantities of torque and horsepower because of the capability of providing both greater housing support at the drive shaft's outermost point and an outermost bearing support system as well.

The elongated rear suspension is of traditional British design including a cantilever system with a loop and triangulation system is used. Five and ¼ inches of rear wheel travel is specified.

The oil reservoir for the four cycle engine 28 is provided within the hollow backbone 22 and hollow downtube 32 which hold over six quarts. This innovation enables the provision in motorcycle 10 of a 26 ½ inch seat height without compromising rear, wheel suspension travel or ground clearance. Oil is added to the oil reservoir through tube 22f shown in FIG. 2.

Motorcycle 10 utilizes all state of the art components which have been integrated into its design over 24 months of developmental work.

Although the preferred embodiments of the invention have been described in detail above, it should be understood that the invention is in no sense limited thereby.

What is claimed is:

1. In a motorcycle having an exposed two-cylinder air-cooled engine, said motorcycle having a front wheel and a rear wheel, said motorcycle having a mainframe to which is a front wheel assembly with handlebars is rotatably connected and to which a rear wheel assembly is pivotally connected, the improvement comprising:
   a. a rigid, generally rectangular mainframe including
      i. a single rigid tubular backbone having a generally horizontal portion having a front end and a rear end, and a generally vertical portion having an upper end and a lower end, said rear end of said generally horizontal portion being rigidly connected to said upper end of said generally vertical portion, said generally vertical portion having a connection cylinder rigidly connected thereto near said lower end of said generally vertical portion,
      ii. a single rigid tubular downtube having an upper end and a lower end, said upper end of said downtube being rigidly connected to said front end of said generally horizontal portion of said tubular backbone,
      iii. an engine support cradle having a front end and a rear end, said front end of said engine support cradle being rigidly connected to said lower end of said downtube and said rear end of said engine support assembly being rigidly connected to said lower end of said generally vertical portion of said backbone, said engine support cradle having an engine support member having a front end and a rear end, the front end of said engine support member being rigidly connected to said lower end of said downtube and the rear end of said engine support member being rigidly connected to said lower end of said vertical portion of said backbone,
   b. a two cylinder air cooled engine rigidly connected to said engine support cradle and to said horizontal portion of said backbone, said engine having a generally horizontal drive shaft located on the left side of said engine, said horizontal drive shaft having a first sprocket connected thereto,
   c. a transmission connected to said engine and to said connection cylinder, said transmission being located adjacent to said engine and inside said mainframe, said transmission having a generally horizontal driven shaft on the left side of said engine, said generally horizontal driven shaft of said transmission being parallel to said drive shaft of said engine, said horizontal driven shaft having a second sprocket connected thereto, said horizontal driven shaft being driven by a belt rotatably connecting said first sprocket to said second sprocket,
   said first sprocket and said second sprocket being covered by a plate rigidly connected to said engine and said transmission and to said connection cylinder, said transmission having a drive shaft on the right side of said transmission for driving a chain connected to said rear wheel of said motorcycle, said drive shaft on the right side of said engine being covered by a plate rigidly connected to said transmission and to said connection cylinder, and
   d. a rear wheel support assembly pivotally connected to said connection cylinder, said rear wheel support assembly having two parallel swingarms, each of said swing arms having a front end and a rear end, the front ends of each of said two parallel swingarms being pivotally connected to said connection cylinder, said rear wheel being rotatably connected to each of said rear ends of said parallel swingarms.

2. The motorcycle of claim 1 wherein said generally horizontal portion of said rigid tubular backbone is integrally formed with said generally vertical portion of said rigid tubular backbone.

3. The motorcycle of claim 1 wherein said generally horizontal portion of said rigid tubular backbone forms an obtuse angle with said generally vertical portion of said backbone.

4. The motorcycle of claim 1 wherein said downtube forms an acute angle with said generally horizontal portion of said tubular backbone.

5. The motorcycle of claim 1 wherein said tubular backbone has an outside diameter of about three inches.

6. The motorcycle of claim 5 wherein said tubular backbone has a wall thickness of about 0.125 inches.

7. The motorcycle of claim 1 wherein said tubular downtube has an outside diameter of about two inches.

8. The motorcycle of claim 7 wherein said tubular down tube has a wall thickness of about 0.095 inches.

9. The motorcycle of claim 1 wherein said connection cylinder has an outside diameter of about two inches.

10. The motorcycle of claim 1 wherein the distance between said drive shaft of said engine and said driven shaft of said transmission is about nine inches.

11. The motorcycle of claim 1 wherein the ratio of the distance between said engine drive shaft and said transmission driven shaft and the distance between said downtube and said connection cylinder along the plane including said engine drive shaft and said transmission driven shaft is about 1:2.

12. The motorcycle of claim 11 wherein said ratio is about 0.9:2.

13. The motorcycle of claim 11 wherein said ratio is about 0.8:2.

14. The motorcycle of claim 1 wherein the distance between said downtube and said connection cylinder along the plane including said engine drive shaft and said transmission driven shaft is about 20 inches.

15. In a motorcycle having an exposed two-cylinder air-cooled engine, said motorcycle having a front wheel and a rear wheel, said motorcycle having a mainframe to which is a front wheel assembly with handlebars is rotatably connected and to which a rear wheel assembly is pivotally connected, the improvement comprising:
   a. a rigid, generally rectangular mainframe including
      i. a single rigid tubular backbone having a generally horizontal portion having a front end and a rear end, and a generally vertical portion having an upper end and a lower end, said rear end of said generally horizontal portion being rigidly connected to said upper end of said generally vertical portion, said generally vertical portion having a connection cylinder rigidly connected thereto near said lower end of said generally vertical portion, ii. a single rigid tubular downtube having an upper end and a lower end, said upper end of said downtube being rigidly connected to said front end of said generally horizontal portion of said tubular backbone, iii. an engine support cradle having a front end and a rear end, said front end of said engine support cradle being rigidly connected to said lower end of said downtube and said rear end of said engine support assembly being rigidly connected to said lower end of said generally vertical portion of said backbone, said engine support cradle having two hollow generally horizontal spaced-apart engine support members each of which has a front end and a rear end, the front ends of each of said two hollow generally spaced-apart engine support members being rigidly connected to said lower end of said downtube and the rear ends of each of said two hollow generally spaced-apart engine support members being rigidly connected to said lower end of said vertical portion of said backbone, b. a two cylinder air cooled engine rigidly connected to said engine support cradle and to said horizontal portion of said backbone, said engine having a generally horizontal drive shaft located on the left side of said engine, said horizontal drive shaft having a first sprocket connected thereto, c. a transmission connected to said engine and to said connection cylinder, said transmission being located adjacent to said engine and inside said mainframe, said transmission having a generally horizontal driven shaft on the left side of said engine, said generally horizontal driven shaft of said transmission being parallel to said drive shaft of said engine, said horizontal driven shaft having a second sprocket connected thereto, said horizontal driven shaft being driven by a belt rotatably connecting said first sprocket to said second sprocket, said first sprocket and said second sprocket being covered by a plate rigidly connected to said engine and said transmission and to said connection cylinder, said transmission having a drive shaft on the right side of said transmission for driving a chain connected to said rear wheel of said motorcycle, said drive shaft on the right side of said engine being covered by a plate rigidly connected to said transmission and to said connection cylinder, and d. a rear wheel support assembly pivotally connected to said connection cylinder, said rear wheel support assembly having two parallel swingarms, each of said swing arms having a front end and a rear end, the front ends of each of said two parallel swingarms being pivotally connected to said connection cylinder, said rear wheel being rotatably connected to each of said rear ends of said parallel swingarms.

16. The motorcycle of claim 15 wherein each of said engine support members have an outside diameter of about one and one-fourth inches.

17. The motorcycle of claim 16 wherein each of said engine support members have a wall thickness of about 0.095 inches.

18. The motorcycle of claim 15 wherein a rigid brace member is rigidly connected to each of said engine support members to increase the rigidity of said engine support members, said brace member being located between said front ends and said rear ends of said engine support members.

19. The motorcycle of claim 15 wherein said generally horizontal portion of said rigid tubular backbone is integrally formed with said generally vertical portion of said rigid tubular backbone.

20. The motorcycle of claim 15 wherein said generally horizontal portion of said rigid tubular backbone forms an obtuse angle with said generally vertical portion of said backbone.

* * * * *